No. 822,514. PATENTED JUNE 5, 1906.
C. E. FELT & D. A. KIMBARK.
GUIDE FOR COUPLING MEMBERS.
APPLICATION FILED DEC. 10, 1902
2 SHEETS—SHEET 1.
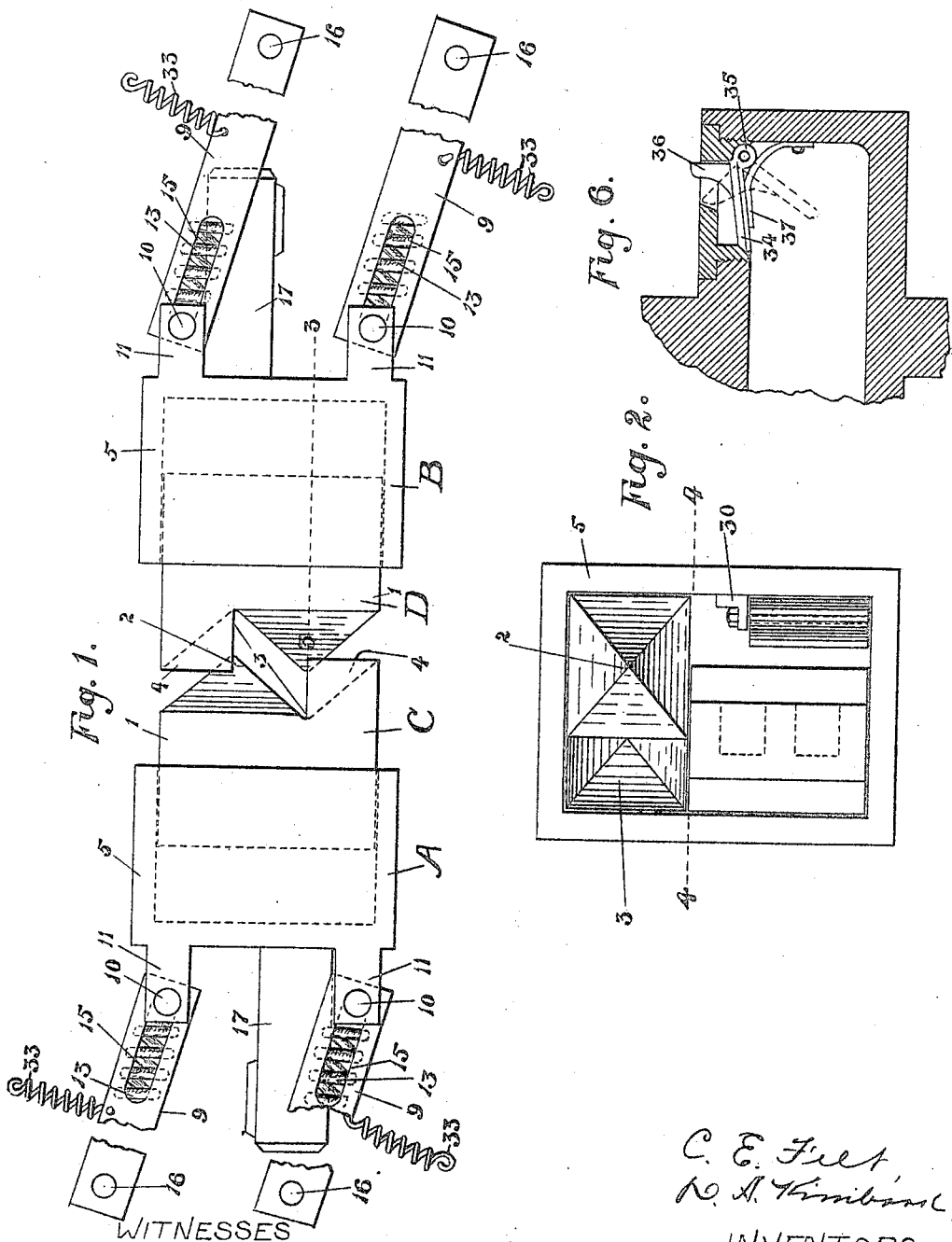

No. 822,514. PATENTED JUNE 5, 1906.
C. E. FELT & D. A. KIMBARK.
GUIDE FOR COUPLING MEMBERS.
APPLICATION FILED DEC. 10, 1902.
2 SHEETS—SHEET 2.
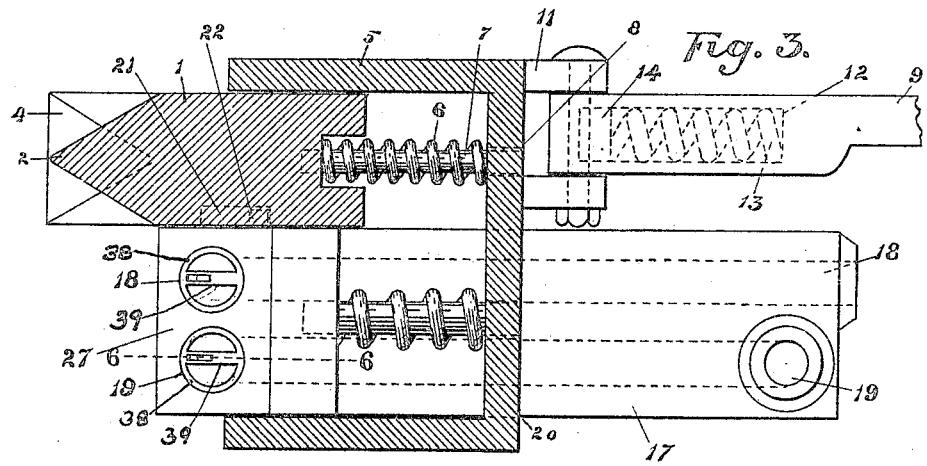
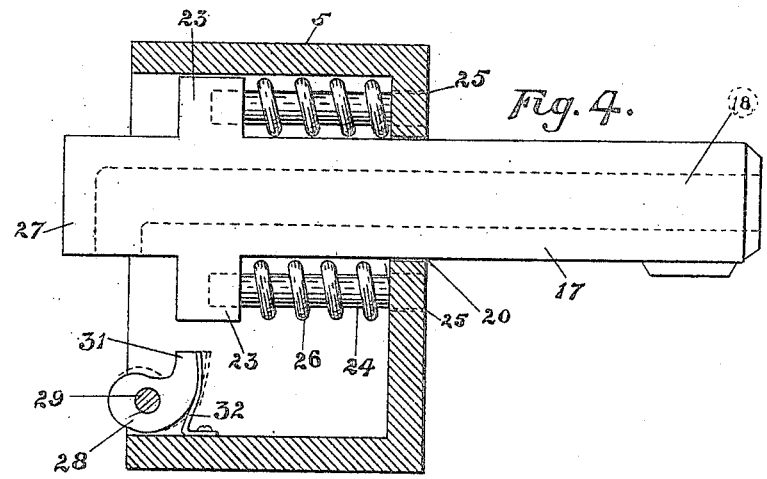
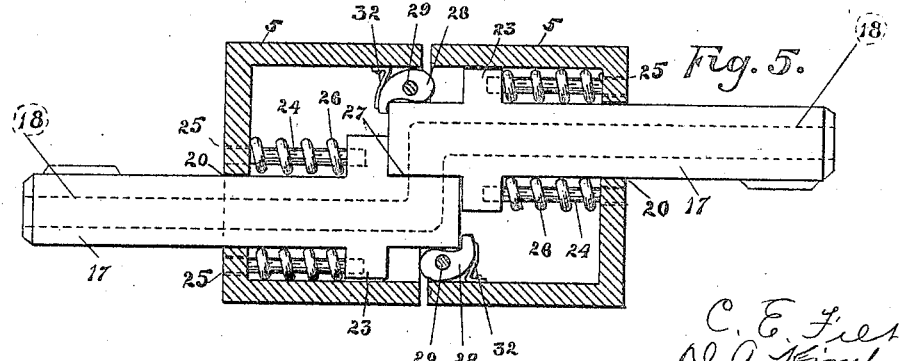
WITNESSES
C. E. Felt
D. A. Kimbark
INVENTORS.
BY Elliott & Hopkins
ATTORNEYS.

UNITED STATES PATENT OFFICE.

CHARLES E. FELT AND DANIEL A. KIMBARK, OF CHICAGO, ILLINOIS, ASSIGNORS TO ELECTRIC SPECIALTY CO., OF CHICAGO, ILLINOIS, A CORPORATION OF ILLINOIS.

GUIDE FOR COUPLING MEMBERS.

No. 822,514.     Specification of Letters Patent.     Patented June 5, 1906.

Application filed December 10, 1902. Serial No. 134,659.

*To all whom it may concern:*

Be it known that we, CHARLES E. FELT and DANIEL A. KIMBARK, citizens of the United States, residing at Chicago, in the county of Cook and State of Illinois, have invented certain new and useful Improvements in Guides for Coupling Members, of which the following is a full, clear, and exact specification.

Our invention relates to means for guiding coupling members of every description into proper union with each other; but for the purposes of illustration we have shown the invention as applied to the coupling members of a pipe-coupling especially adapted for air-brake or steam-pipe connections on railway-cars.

The primary object of the invention is to provide guiding members which may be of facsimile construction and which shall be universal in their ability to fit with similar members, eliminating the necessity of having one male and the other female.

With these ends in view our invention consists in certain features of novelty in the construction, combination, and arrangement of parts by which the said objects and certain other objects hereinafter appearing are attained, all as fully described, with reference to the accompanying drawings, and more particularly pointed out in the claims.

In the said drawings, Figure 1 is a plan view of two air-brake or steam-pipe coupling members provided with our improved guides, showing the members in the act of coming together. Fig. 2 is an end or face view of one of the couplings. Fig. 3 is a vertical section on the line 3 3, Fig. 1. Fig. 4 is a plan section on the line 4 4, Fig. 2. Fig. 5 is a plan section of the two couplings fitted together; and Fig. 6 is an enlarged section on the line 6 6, Fig. 3.

In applying our invention each of the couplings is provided with one of our improved guiding members, and inasmuch as the guiding members are identical in construction the description of one will suffice for both, and the same is true with reference to the particular form of pipe-coupling members which we have elected to show in connection with our invention.

A B represent, respectively, the coupling members generally, and C D indicate generally the guide members attached to said coupling members, respectively.

Each of the guide members C D consists of a block which has a body portion 1, preferably rectangular in exterior formation, and on one side or at one point on one side of this body portion is a protuberance 2, which is pointed and preferably of pyramidal form, and on the other side or at another point on the same end it is provided with a depression or recess 3, which is complementary in form to the protuberance 2, and, as shown in Fig. 2, it is of a form which would be produced by an imprint of one-half of the protuberance 2 divided through its apex, thus bringing the center or point of convergence of the walls of the depression 3 half-way between its edge and the apex of the projection or protuberance 2 and directly in the line or at the edge of the base of the pyramid. The base of the pyramid is equal in diameter to the thickness of the block or body portion 1, and the sum of the widths of the pyramid and the depression 3 is equal to the width of the block or body portion 1, so that the base of the pyramid on three sides will be flush with the edges of the block 1 on three sides, as clearly indicated in Figs. 1 and 2, and thus also leaving on one side of the block or body 1 opposite that on which the projection 2 is located a square or rectangular projection 4, in which the half-pyramidal imprint 3 is formed. Each of these guide members C D is fitted in a socket 5, so as to be capable of sliding back and forth therein, and when the two sockets 5 are turned toward each other, as indicated in Fig. 1, it will be seen that the depression 3 in one of the guide members will come opposite the projection or protuberance 2 on the other guide member, and consequently should each end of the car be equipped with a coupling member having one of these guide members the coupling member on either end of any car will match the coupling member on either end of any other car, and when the couplings come together the guide members C D by virtue of their pointed protuberances and recesses or imprints of complementary form will guide the coupling members into accurate register.

The guide members C D are preferably cushioned in their sockets 5 by means of springs 6, which are sleeved on guide-stems 7 between the inner ends of the guide members and the inner walls of the sockets 5, the stem 7 being secured to the guide members and passing loosely through perforations 8 in the wall of the socket, so as to permit the guide members to recede into their sockets when the couplings come together. The sockets 5 are also cushioned as a whole on any suitable supporting-arms, such as parallel arms 9, pivoted by bolts or pins 10 to ears or lugs 11 on the sockets 5, the ends of the arms 9 being hollow, as shown at 12, and provided with springs 13, which bear against followers 14, resting against the bolts or pins 10, which latter slide back and forth in slots 15 in the chambered ends of the arms 9. The arms 9 being parallel they are capable of lateral motion while holding the faces of the coupling members A B parallel with each other, and the arms being set at an incline, as shown in Fig. 1, and pivoted at their outer ends, as indicated at 16, the coupling members may readily adapt themselves to any irregular motion of the cars.

The guides thus described may be applied to any coupling members; but when applied to air-brake or steam pipes the construction shown in the drawings is preferable. In this construction it will be seen that each of the couplings A B is provided with a pipe-union member 17, comprising two passages 18 19, which may be utilized for air and steam, respectively. The member 17 slides in the socket 5 under and, if desired, constitutes a support for the block 1, the sides of the members 17 being flat, so as to fit the block and the bottom of the socket 5, and one end of the union 17 passes through an aperture 20 of complementary form in the back wall of the socket 5, so that the entire union member will also be capable of sliding back and forth in the socket while constituting a support for block 1, the under side of which may be provided with a recess 21, in which works a pin 22, projecting from the upper side of the member 17, so that the block 1 and member 17 will be capable of a limited independent movement beyond which they move together.

Each side of the member 17 within the socket 5 is formed with a shoulder or lug 23, and projecting from each of these is a guide-stem 24, which extends through a suitable aperture 25 in the back of the socket, and upon which stem is sleeved a compression-spring 26, which forces the member 17 outwardly through the mouth of the socket 5.

The two passages 18 19 may be carried through one end of the member 17 at any desired points to make convenient connection with pipes (not shown) with which they are intended to communicate; but at the other end of the member 17 these passages are brought through a flat face 27 on the inner side of the member 17 at points outwardly from one of the shoulders 23. When the coupling members come together, this flat face 27 on one of the members 17 overlaps the face 27 on the other and the ends of the members 17 strike against the opposed shoulders 23, as shown in Fig. 5, thereby compressing the springs 26 and holding the passages 18 19 in the face 27 in register. In order now that these faces 27 may be automatically clamped together with sufficient force to prevent leakage when the couplings come together, each of the couplings is provided with some suitable means capable of converting the longitudinal force of the member 17 into a transverse stress, resulting in forcing the inner ends of the members 17 toward each other. As an example of such a means we have provided each of the sockets 5 with a cam or clamping-dog 28, pivoted on a pin 29, which is secured at its lower end at the bottom of the socket 5 and at its upper end in a bracket 30, secured to a side wall of the socket. This cam or dog 28 has a lever 31, which is normally held by spring 32 in the line of movement of the inner end of member 17, so that as member 17 projects into the opposite socket against this lever 31 and turns the cam on its pivot 29 the wider part of the cam will force member 17 transversely against face 27 of the opposite member 17 with a degree of pressure proportional to the pressure of the member 17 against lever 31, and this pressure of member 17 against lever 31 is maintained by any suitable cushions or springs 33, secured to the parallel arms 9.

In order that the passages 18 19 may be automatically closed when the couplers pull apart, the ends thereof which open through the faces 27 may be provided with valves 34, which are pivoted at 35 and have their outer sides provided with lugs 36, adapted to be struck by the ends of members 17 as the latter slide together, and thereby force the valves 34 inwardly away from their seats, the valves being closed automatically when the couplers pull apart by suitable springs 37. These valves are shown as set on a slight incline in bushings 38, screwed into the faces 27 and having slotted cross-bars 39, which serve to hold the lugs 36 depressed when the couplings are together, while permitting them to protrude as the valves close when the couplings separate.

Having thus described our invention, what we claim as new therein, and desire to secure by Letters Patent, is—

1. In a guide for coupling members the combination of one guide member having a depression at one point and a pointed protuberance at another point complementary in form to said depression, the center of the depression being located a distance from the apex of the protuberance equal to half the diameter of the latter, and another guide member of facsimile formation but with its depression and protuberance arranged opposite the protuberance and depression respectively of the first said guide member, substantially as set forth.

2. In a guide for coupling members the combination of one guide member having a depression at one point and a pointed protuberance at another point, the center of the depression being located at the edge of the base of said protuberance, and another guide member of facsimile formation but with its depression and protuberance arranged opposite the protuberance and depression respectively of the first said guide member, substantially as set forth.

3. In a guide for coupling members the combination of one guide member having a pyramidal protuberance at one point and a depression at another point complementary in form to said protuberance, and another guide member of facsimile formation but with its depression and protuberance arranged opposite the protuberance and depression respectively of the first said guide member, substantially as set forth.

4. In a guide for coupling members the combination of one guide member having a pointed protuberance at one point and a depression at another point such as would result from the imprint of one-half of said pointed protuberance divided through the apex thereof, and another guide member of facsimile formation but with its depression and protuberance arranged opposite the protuberance and depression respectively of the first said guide member, substantially as set forth.

5. In a guide for coupling members the combination of one guide member comprising a rectangular block, a portion of two sides and one end of which constitute three sides of the base of a pyramid projecting from the end of said block, said block in the same end having a depression one side of which is constituted by one side of said pyramid, and which depression is complementary in form to said pyramid, and another guide member of facsimile formation but with its depression and pyramid arranged opposite the pyramid and depression respectively of the first said guide member, substantially as set forth.

6. In a guide for coupling members the combination of one guide member having a depression at one point and a protuberance at another point complementary in form to said depression, another guide member of facsimile formation but with its depression and protuberance arranged opposite the protuberance and depression respectively of the first said guide member, and two sockets individual to said guide members in which they are respectively cushioned, substantially as set forth.

7. In a guide for coupling members, the combination of one guide member having a depression at one point and a protuberance at another point complementary in form to said depression, another guide member of facsimile formation, but with its depression and protuberance arranged opposite the protuberance and depression respectively of the first said guide member, and two sockets individual to said guide members and in which they are respectively housed, and cushions contained in said sockets for cushioning said guide members therein.

8. In a device of the class described, the combination of two pipe-union members, having apertured matched faces adapted to fit together in a direction lengthwise of the planes of said faces, means for guiding said faces into register in a direction parallel with their planes, and a cam mounted in fixed relation to one of said members and standing within the path of the movement of the other member and adapted to be engaged and operated by said other member for forcing the faces of the two members together at an angle to their planes.

9. In a device of the class described, the combination of two pipe-union members, having apertured matched faces adapted to fit together in a direction lengthwise of the planes of said faces, means for guiding said faces into register in a direction parallel with their planes, and a cam mounted in a fixed relation to one of said members, said cam being provided with an operating portion standing within the path of movement of the other member and adapted to be engaged by the said other member for causing the cam to force the face of the two members together at an angle to their planes.

CHARLES E. FELT.
DANIEL A. KIMBARK.

Witnesses:
M. B. ALLSTADT,
A. D. LOTHROP.